(12) United States Patent
Ito et al.

(10) Patent No.: US 6,216,056 B1
(45) Date of Patent: Apr. 10, 2001

(54) METHOD OF CONTROLLING FORCE ASSISTING DEVICE AND CONTROL APPARATUS USING THE SAME

(75) Inventors: Akihiro Ito; Haruhiro Tsuneta; Yasuyuki Kitahara; Masao Hiraguri, all of Nagano (JP)

(73) Assignee: Kabushiki Kaisha Sanyo Seiki Seisakusho, Nagano (JP)

( * ) Notice: Subject to any disclaimer, the term of this patent is extended or adjusted under 35 U.S.C. 154(b) by 0 days.

(21) Appl. No.: 08/991,206

(22) Filed: Dec. 16, 1997

(30) Foreign Application Priority Data

Dec. 16, 1996 (JP) .................................................. 8-336178

(51) Int. Cl.[7] ...................................................... G06F 19/00
(52) U.S. Cl. ............................ 700/157; 700/87; 700/259; 700/260; 700/263; 901/3; 901/9
(58) Field of Search ...................................... 700/157, 260, 700/259, 263, 87; 901/3, 17, 9, 34, 45, 47

(56) References Cited

U.S. PATENT DOCUMENTS

| | | | |
|---|---|---|---|
| 4,367,532 | 1/1983 | Crum et al. | 364/513 |
| 4,408,286 | 10/1983 | Kikuchi et al. | 364/513 |
| 4,791,588 | * 12/1988 | Onda et al. | 364/513 |
| 4,912,388 | 3/1990 | Tanaka et al. | 318/640 |
| 4,954,762 | * 9/1990 | Miyake et al. | 318/568.19 |
| 5,086,401 | * 2/1992 | Glassman et al. | 700/259 |
| 5,382,885 | 1/1995 | Salcudean et al. | 318/568 |
| 5,710,870 | * 1/1998 | Ohm et al. | 700/263 |
| 5,767,648 | * 6/1998 | Morel et al. | 318/568.1 |
| 5,784,542 | * 7/1998 | Ohm et al. | 700/260 |
| 5,828,637 | * 10/1998 | Kim | 369/44.28 |

FOREIGN PATENT DOCUMENTS

| | | | |
|---|---|---|---|
| 0 159 131 | 10/1985 | (EP) | G05B/19/42 |
| 5-3304 | 1/1993 | (JP) | A61B/19/00 |

OTHER PUBLICATIONS

Wang et al, "A Robotized Surgeon Assistant", vol. 2, Sep. 1994, pp. 862–869 European Search Report.

* cited by examiner

Primary Examiner—William Grant
Assistant Examiner—Victoria Robinson
(74) Attorney, Agent, or Firm—Sughrue, Mion, Zinn, Macpeak & Seas, PLLC

(57) ABSTRACT

With an operation handle arranged in the neighborhood of e.g. a microscope for operation as an appliance to be supported attached to the tip of plural arms rotatably coupled with one another, the operation force applied to the operation handle is detected as a signal in directions of plural axes by a force/torque sensor, the detected force/torque information in each of the directions of the plural axes is impedance-control and track-control to compute an operation command for each joint in the plural arms, and on the basis of the operation command for each joint, the plural arms are moved in the direction of the operation force.

14 Claims, 7 Drawing Sheets

METHOD OF CONTROLLING FORCE ASSISTING DEVICE AND CONTROL APPARATUS USING THE SAME

BACKGROUND OF THE INVENTION

1. Field of the Invention

The present invention relates to a force assisting device capable of moving an appliance having a heavy weight through assistance of an actuator by only application of small force by an operator. More particularly, the present invention relates to a method of controlling a force assisting device which is suitable to support a microscope for surgical operation movable by small force and a control apparatus using this device.

2. Related art

A force assisting device is a device for supporting a heavy object so as to be easily movable by an old person or even a common person in a manner of amplifying small force by the operator. For example, in a medical field, a doctor uses a microscope in order to observe an affected part extensively during surgical operation. The microscope, if it is large scaled, is supported by a force assisting device so that it can be moved by small force.

Examples of this force assisting device are to support the microscope by a balancer such as a weight or spring so that it can be moved by small force, and to'support the microscope by a balancer and also shift or rotate the microscope in a prescribed direction by operating a joystic or switch using an electric or hydraulic motor as a power source (e.g. Japanese Patent Publn. 5-3304).

However, the above force assisting device which moves the microscope by the balancer is poor in operability because the weight balance varies according to changes in the position and orientation of the microscope or replacement of the microscope and hence the operation force that an operator needs also varies.

Since balance adjustment is complicated, the maintenance is troublesome. The above force assisting device using the balancer cannot perform a "point lock operation" of moving an environment so as to change the observation perspective of a focal point with the focal point of the microscope being fixed (making the environment movable or rotatable along a prescribed track).

The force assisting device which shifts or rotates the microscope in a prescribed direction by operating a joystic or switch is also poor since the microscope can be shifted or moved only in a prescribed direction. When the microscope is moved by the on/off operation of the joystick or switch, it performs a clumsy operation such as abrupt start or stop so that a sense of a smooth operation cannot be obtained.

SUMMARY OF THE INVENTION

Under the circumstance described above, the present invention intends to provide a method of controlling a force assisting device which is constant in operability regardless of the position and orientation of an object to be supported such as a heavy object, can move or rotate on a prescribed track such as a "point lock" and can move or rotate smoothly using a motor as a power source. The present invention also intends to provide a control apparatus using this method.

According to the present invention, there is provided a control apparatus for controlling a force assisting device comprising:

a plurality of arms coupled so as to be sequentially drivable through joints on a stand;

a plurality of motors for driving said plurality of motors through said joints, respectively;

an appliance to be supported attached to said tip of said plurality of arms coupled with each other;

an operation handle arranged in the vicinity of the appliance and operated by an operator in order to move said appliance;

a force/torque sensor for producing force/torque information in directions of plural-axes from operation force applied to said operation handle;

an impedance control unit and track control unit for computing an operation command for each said joint in said plurality of arms on the basis of said force/torque information detected by said force/torque sensor; and a motor control unit for controlling said motors so as to drive said plurality of arms through each said joint on the basis of the operation command of each said joint.

As apparent from the explanation hitherto made, the method of controlling the force assisting device according to the present invention detects, by the force/torque sensor, operation force applied to an operation handle arranged in the vicinity of an appliance to be supported, impedance-controls and track-controls the detected force/torque information in directions of plural axes to compute the operation command for each joint of a plurality of arms, and moves the arms in the direction of the operation force on the basis of the operation command. Further, the control apparatus for the force assisting device according to the present invention comprises a plurality of arms rotatably coupled with one another; motors each for driving each of the plurality arms; an appliance to be supported attached to the tip of the plurality of arms; an operation handle arranged in the neighborhood of the appliance; a force/torque sensor for detecting operation force; an impedance control unit and track control unit for computing the operation command for each joint based on the force/torque information; and motor control unit for performing the motor control on the basis of the operation command for each joint. For this reason, where the force/torque information of the operation force is impedance-controlled to compute the operation command for each joint, thereby providing the movement or rotation of the plurality of arms, a natural operation sense inclusive of a sense of inertial force and viscosity can be obtained. Thus, the movement and rotation of the microscope 2 can be effected smoothly.

By subjecting the force/torque information of the operation force to the track control to compute the operation command for each joint, the appliance to be supported can perform the movement or rotation on a prescribed track such as a point lock which is a predetermined operation mode and hence its operability can be improved.

DETAILED DESCRIPTION OF THE PREFERRED EMBODIMENTS

Figure 1:
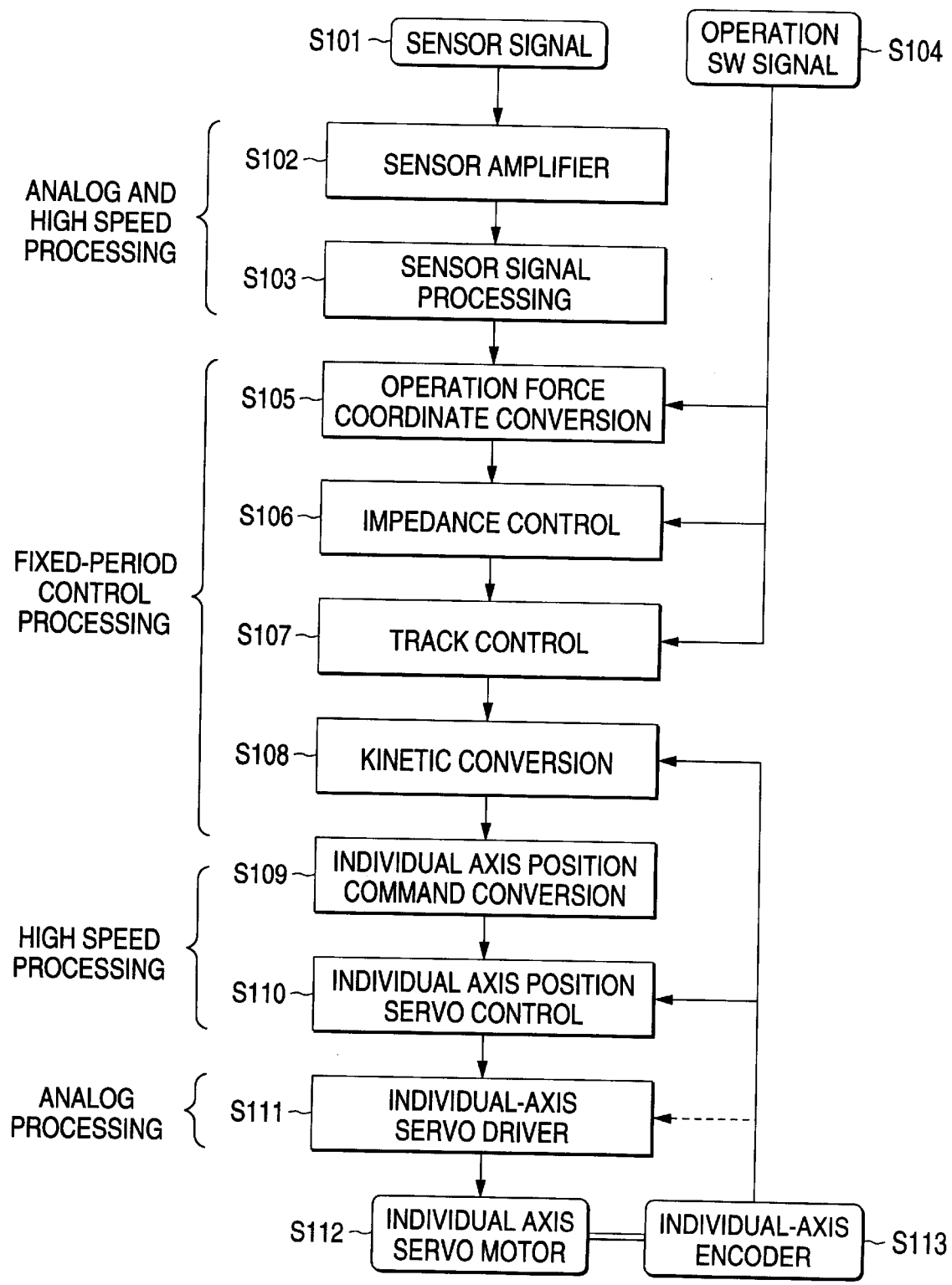
FIG. 1 is a flowchart showing a method of controlling a force assisting device according to the present invention.

On the basis of an example shown in the drawings, the structure of the present invention will be explained below. As seen from FIGS. 2 and 3, a control apparatus 1 for a force assisting device in this embodiment includes a plurality of arms A1 to A7 which are right bodies coupled drivably successively through joints from a base plate 9; motors (not shown) driven to cause the plurality of arms A1 to A7 to perform predetermined operations; a microscope 2 for surgical operation attached to the tip of the arm A7 which is an appliance to be supported; an operation handle 3 arranged in the neighborhood of the microscope 2; a force/torque sensor (hereinafter referred to as "FT sensor") 4 for outputting operation force applied to the operation handle 3 as force/torque information in directions of plural axes; an impedance control unit 5 and a track control unit 6 for computing operation commands for joints J1 to J6 of the plurality of arms A1 to A7 on the basis of the force/torque information in the directions of plural axes detected by the FT sensor 4; and a motor control unit 7 for driving the plurality of arms A1 to A7 in predetermined directions on the basis of the operation commands for the joints J1 to J7. Among these components, the impedance control unit 5, track control unit 6 and motor control unit 7 are constituted and operated by an electric circuit and software of a computer. In this specification, it should be noted that the "force/torque sensor" means a sensor which can simultaneously measure the parallel force in a direction of a prescribed axis, e.g. X-axis, Y-axis or Z-axis, and rotational force around each axis.

Figure 3:
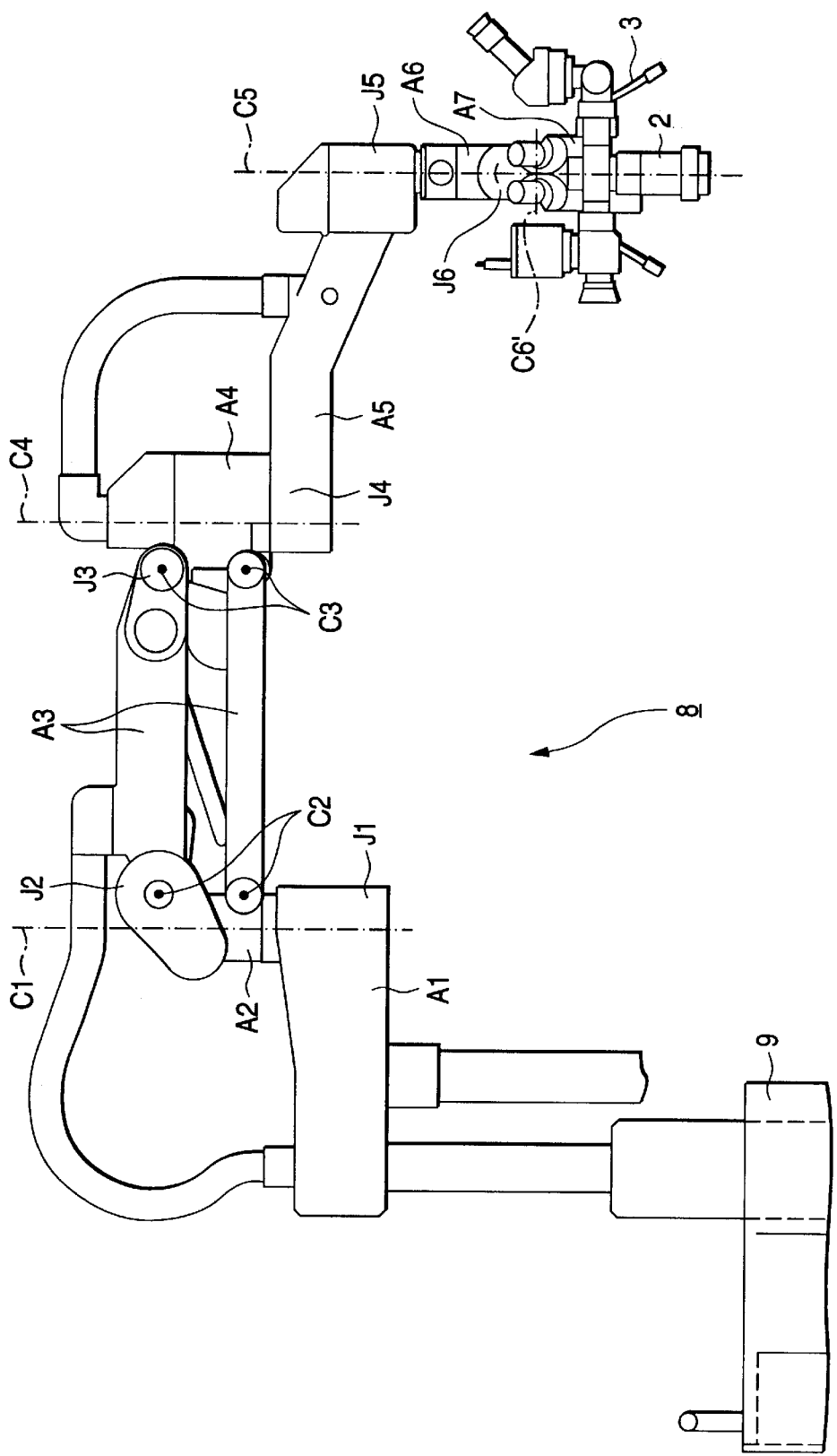
FIG. 3 is a side view showing a manipulator stand.
Figure 4:
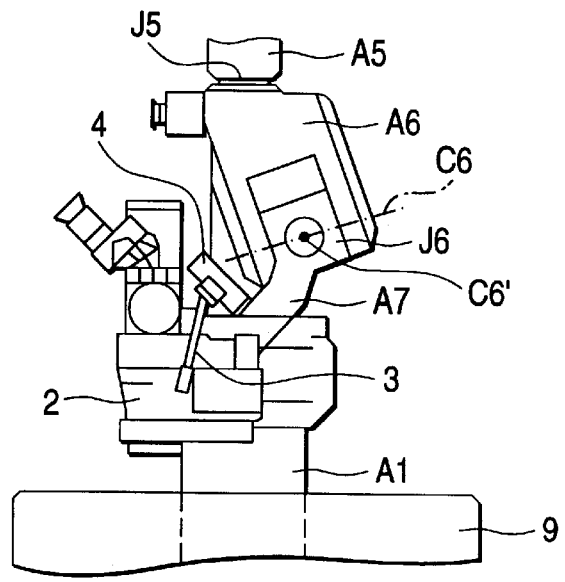
FIG. 4 is a side of a microscope showing its attaching state.
Figure 5:
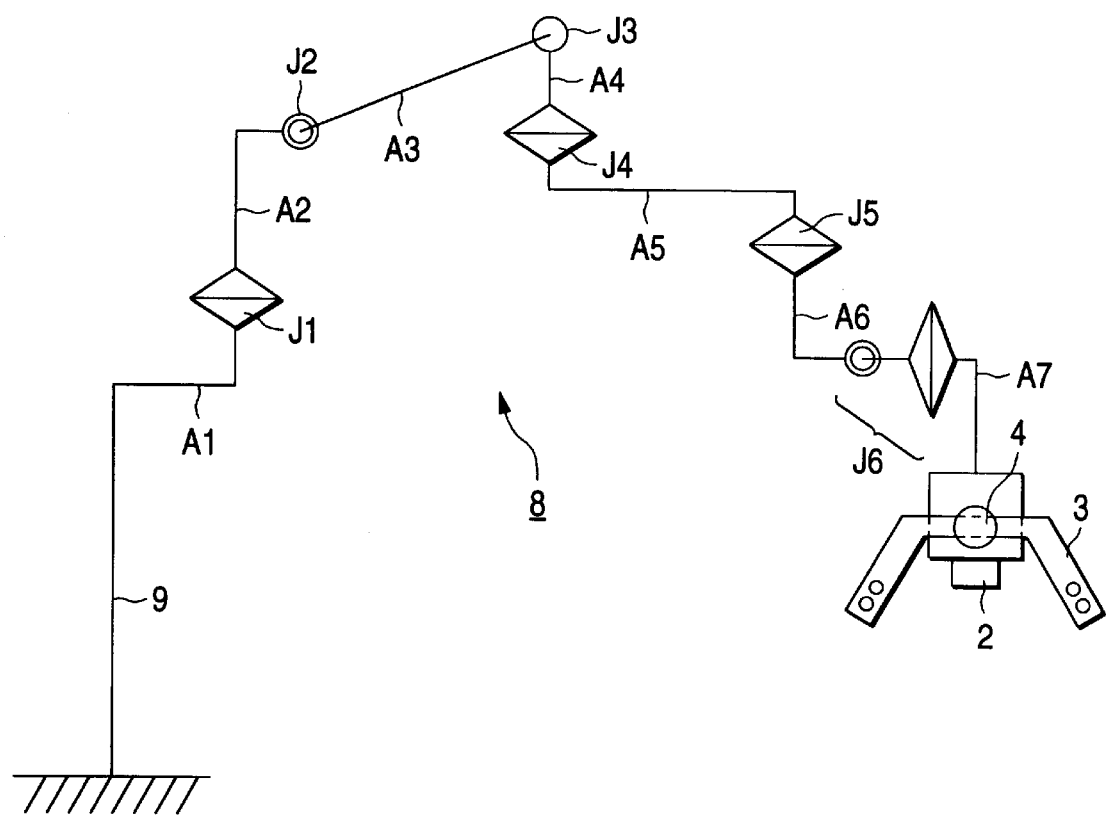
FIG. 5 is a skeleton view showing a manipulator stand.

As seen from FIGS. 3 to 5, the plurality of arms A1 to A7 and the motors for driving them constitute a manipulator stand B. The manipulator stand 8 includes the first arm A1 supported on the base plate 9 and movable vertically; second arm A2 attached rotatably horizontally around a plumb line C1 for the first arm A1; a first joint coupling the first arm A1 with the second arm A2; third arms A3 composed of a set of parallel links attached to the second arm A2 along their horizontal axial lines C2, C2 swingably in their plumb direction; a second joint J2 coupling the second arm 2 and third arm A3 with each other; a forth arm A4 attached to the third arms A3 swingably around their horizontal axes C3; a third joint coupling these third arms A3 and forth arm A4 with each other; a fifth arm A5 attached to the fourth arm A4 rotatably horizontally around its plumb axis C4; a forth joint J4 coupling these fourth arm A4 and fifth arm A5 with each other; a six arm A6 attached to the fifth arm A5 rotatably horizontally around the plumb axis C5; a fifth joint J5 coupling the fifth arm A5 and six arm A6; a seventh arm A7 attached to the six arm A6 rotatably around its horizontal axes C6 and C6' and provided with the microscope 2 and operation handle 3; and a six joint coupling these six arm A6 and seventh arm A7.

Motors which rotate individually are attached to the corresponding joints J1 to J6. Each of these motors may be a servo motor or stepping motor using electric power as a driving source, or a hydraulic motor. An angle sensor (not shown) is attached to each of the joints J1 to J6. The angle sensor serves to detect the present angle of each of the joints J1 to J6. On the basis of the detection result, the position and moving profile of the microscope 2 can be computed. The angle sensor may be e.g. encoder.

In this embodiment, the first arm A1 is attached to the base plate 9 so as to be movable, but may be secured to the base plate 9. How the respective arms are coupled with one another (whether each arm is made fixed, made movable horizontally or vertically, rotatable horizontally or vertically, etc.) should be determined as needed according to how the appliance is supported or moved. Therefore, a detailed explanation will be given of the other embodiments. The third arms A3, A3 constitute a mechanism of a set of parallel links. Specifically, the swinging center lines C2, C2 of the arms A3, A3 on their stem side are located at the positions in the plumb direction of the second arm A2 and the swinging center lines C3, C3 of the arms A3, A3 on their tip side are located at the positions in the plum direction of the fourth arm A4 so that the fourth arm A4 is movable with its profile being unchanged.

The microscope 2 may be a video camera having a optical microscope or image pick-up device. In this embodiment, the movement and rotation of the microscope 2 by the manipulator stand 8 is effected in a designated movement mode selected by an operator from a "point lock mode", "parallel movement mode", "focus movement mode" and "all free mode".

Figure 8:
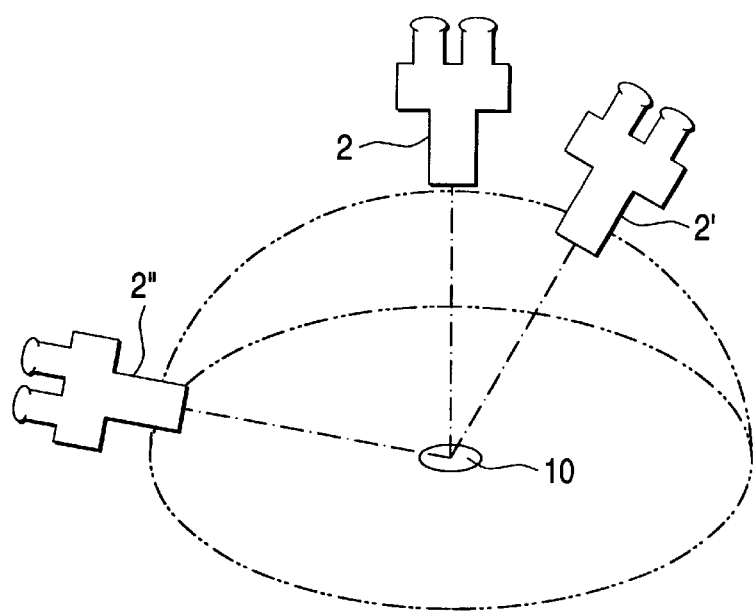
FIG. 8 is a perspective view of the movement state of the microscope in a point lock mode.

In the point lock mode, as three positions are shown as a typical example in FIG. 8, the movement and rotation of the microscopes 2, 2' and 2" are controlled so that with the focal points of the microscopes 2 being fixed, on the sphere having a radius of a focal distance around the fixed focal point 10, they are always oriented toward the focal point 10. This mode is used when the focal point 10 is seen from various angles by the microscope 2.

Figure 9:
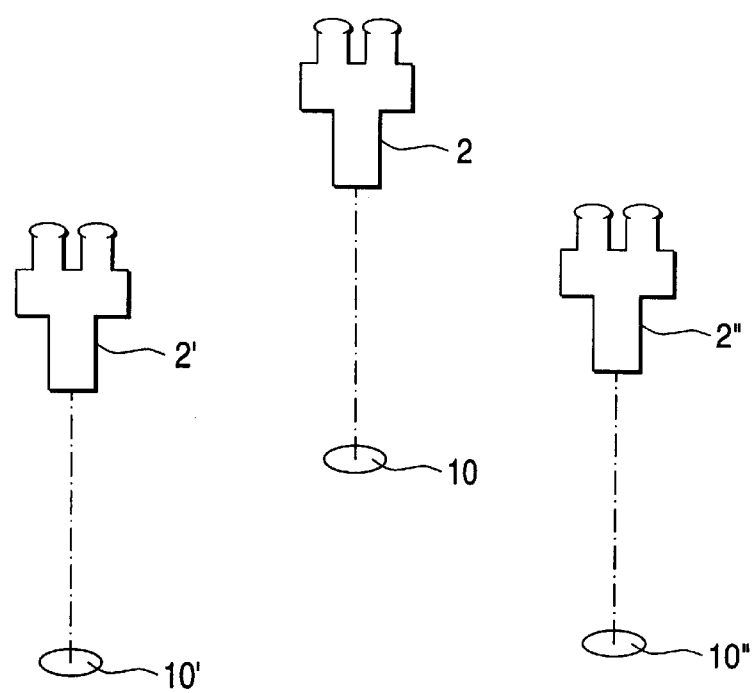
FIG. 9 is a perspective view of the movement state of the microscope in a parallel movement mode.

In the parallel movement mode, as three positions are shown as a typical example in FIG. 9, only the parallel movement of the microscopes 2, 2' and 2" in the X, Y and Z directions is permitted and the rotation thereof is inhibited. In this case, the focal positions 10, 10' and 10" move as the microscope 2 moves. This mode is used, for example, when a change in the profile of the mirror cylinder of the microscope 2 is not desired at the time of fine adjustment during an surgical operation.

Figure 10:
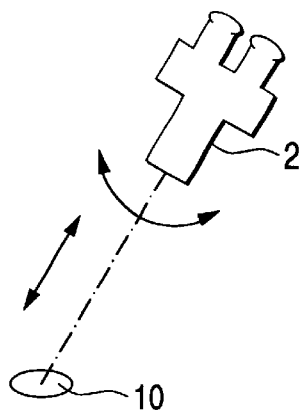
FIG. 10 is a perspective view of the movement state of the microscope a focus movement mode.

In the focus movement mode, as seen from FIG. 10, the parallel movement in the mirror cylinder/focal axis (i.e. Z-axis) of the microscope 2 and rotation around the Z-axis are only permitted. This mode is used for an focusing operation.

In the all free mode, six freedoms of parallel movement and rotation in the X, Y and Z directions of the microscope 2 can be changed optionally. This mode, which permits the mirror cylinder of the microscope 2 and focal point to be moved optionally, is used for rough positioning at the time of surgical operation.

It should be noted that the movement mode of the microscope 2 is not limited to these modes. For example, the parallel mode in which only the parallel movement of the microscope in the X and Y direction is permitted and the parallel movement in the Z direction and each rotation is inhibited. In this case, the focal point moves in an X-Y plane.

Figure 6:
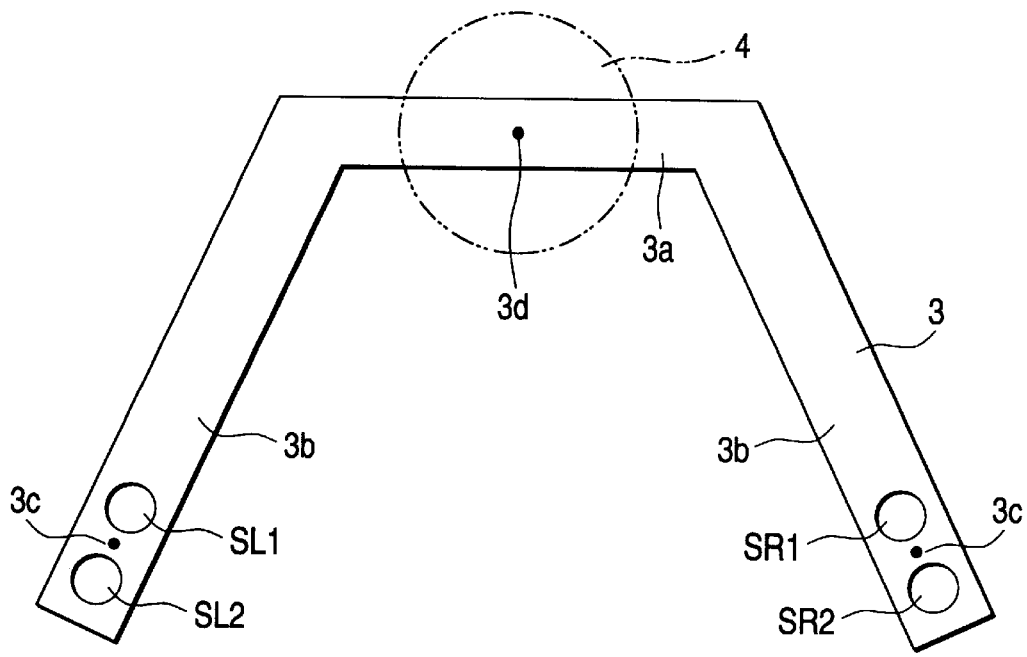
FIG. 6 is a front view showing an operation handle and an operation switch.
Figure 7:
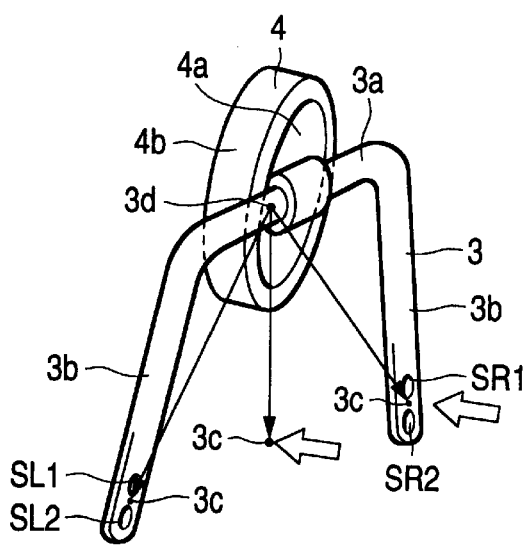
FIG. 7 is a perspective view showing the attaching state of the operation handle to a force/torque sensor.

The operation handle 3 is attached to the seventh arm A1 through the FT sensor 4. The operation handle 3, as shown in FIGS. 6 and 7, has a hill-shape in its entirety, and is composed of a central attaching area 3a and holding areas 3b, 3b which have shapes with both ends of the central attaching area being bent. In the vicinity of the opening ends of the left and right holding areas 3b, 3b, two push switches SL1, SL2 and two SR1 and SR2 are arranged, respectively. By operating these push switches SLI, SL2 and SR1, SR2, the predetermined mode of the movement and rotation of the microscope 2, i.e. the movement mode designating the movement direction is set.

The upper left switch SL1 and upper right switch SRI perform the same function in setting the mode of movement and rotation of the microscope 2. The lower left switch SL2 and lower right SR2 also perform the same function in setting the mode of movement and rotation of the microscope 2. Specifically, in setting the movement and rotation of the microscope 2, the operation of only the switches SL1, SL2 on the left side by a left hand, only the switches SR1, SR2 on the right sides by a right hand and the switches SL1, SL2 and SR1, SR2 by both hands are regarded as the same mode setting. However, when the operation by the right hand and that by the left hand do not coincide with each other, the handle does not operate. The operator is informed-of this fact.

In this embodiment, the switches are allotted so that turn-on of at least one upper switch SL1 or SR1 gives the point lock mode, turn-on of at least one lower switch SL2 or SR2 gives the parallel movement mode, and turn-on of at least one set of upper switches and lower switches SL1 and SL2 or SR1 and SR2 gives the all free mode.

In the state where all the switches are off, each of the joints J1 to J6 is locked so that the position and profile of the microscope 2 is locked and does not move. Therefore, even when unnecessary force is applied to the operation handle 3, the position of the microscope 3 is not displaced.

In this embodiment, although the mode of movement and rotation of the microscope 2 was set in the point lock mode, parallel movement mode or all free mode, it may be set in the focus movement mode or any other mode by adding other switches or changing the allotment of the switches.

Each of the switches SL1, SL2 and SR1, SR2 is turned on when its button is pushed by a finger, and turned off when the finger is separated from the button. It is needless to say that the allotment of the switches and kind thereof should not be limited to such a manner. Further, in this embodiment, although two switches are allotted to the left and right holding areas 3a and 3b, respectively, with only one switch allotted to the left and right holding areas 3a and 3b, the mode may be changed according to the number of turn-on of the switch (click operation).

The FT sensor 4 actually used in this embodiment is a six-axis force torque sensor which is a commercially available disk-shaped product (force torque sensor which is available form BL AUTOTEC CORP. or a six-axis force sensor which is available from NITTA CORP). The six-axis force torque sensor serves to detect the parallel movement force in three directions of the X, Y and Z axes and torque around these axes, and processes the output signals from distortion gauges attached to its body to acquire the signal which is force/torque information in the above directions of six axes. In the FT sensor 4, as shown in FIG. 7, the attaching area 3a of the operation handle 3 is secured to an inner plate 4a of the FT sensor 4, and an outer cylinder 4b of the FT sensor 4 is fixed to the seventh arm A7. Using the plural incorporated distortion gauges, the operation force- or torque-applied to the operation handle 3 by the operator is detected about the directions of six axes.

Figure 2:
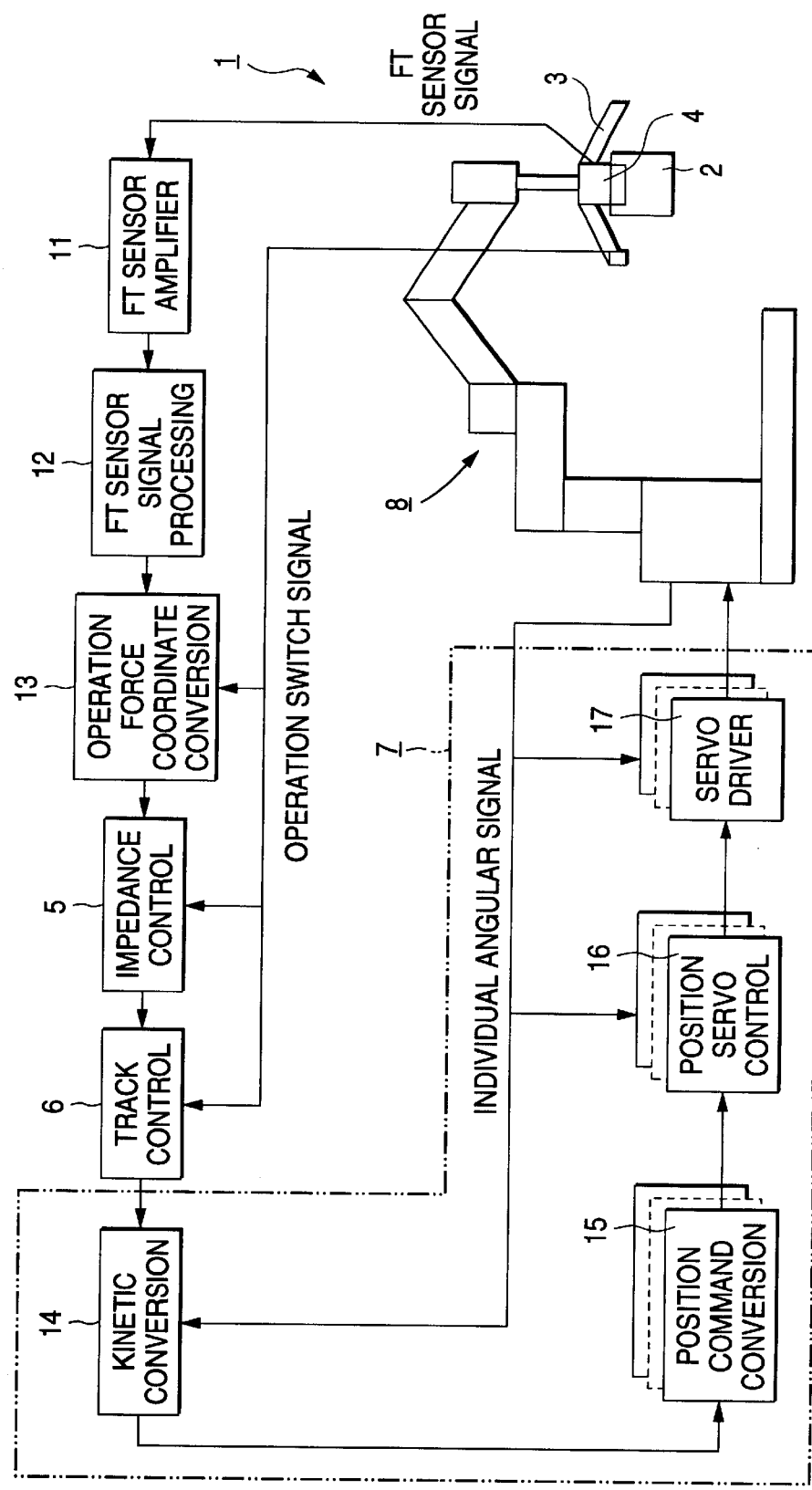
FIG. 2 is a conceptual view showing a control apparatus for the force assisting device according to the present invention.

As shown in FIG. 2, between the FT sensor 4 and impedance control unit 5, an FT (force/torque) sensor amplifier 11, an FT (force/torque) sensor signal processing unit 12 and an operational coordinate conversion unit 13 are intervened. These FT sensor amplifier 11, FT sensor signal processing unit 12 and operational coordinate conversion unit 13 are constituted and operated by an electric circuit and software of a computer.

The FT sensor amplifier 11 is connected to the FT sensor 4. The FT sensor amplifier 11 amplifies the analog signal in the above directions of six axes which is the force/torque information from the FT sensor 4 and converts it into a digital signal.

The FT sensor signal processing unit 12 is connected to teh FT sensor amplifier 11. The sensor signal processing unit 12 filters the digital signal from the FT sensor amplifier 11 to noise-cut the high frequency component and calibrates it on the basis of a correction value inherent to the FT sensor 4. Namely, the FT sensor 4, which commonly has an inherent bias, calibrates such a measured value to be converted into correct force/torque in the directions of six axes.

The operational force coordinate conversion unit 13 is connected to the FT sensor signal processing unit 12. The operational force coordinate conversion unit 13 performs the coordinate conversion of force or torque in the directions of six axes obtained by the FT sensor signal processing unit 12 in order to correct a deviation of the operational direction of the operation handle 3 from the direction of attaching the FT sensor 4. Specifically, according to the circumstances of the space used when the FT sensor 4 is attached to the seventh arm A7, as the case may be, the coordinate in the directions of six axes detected by the FT sensor 4 may not coincide with that on the manipulator stand 8. In this case, the coordinate in the directions of six axes measured by the FT sensor 4 is corrected by the operational force coordinate conversion unit so that it coincides with that on the manipulator stand 8.

Preferably, the operational force coordinate conversion unit 13 makes the correction relative to the compensation of gravity. The method therefor may be a known technique and hence its details will not be explained here. In this embodiment, between the FT sensor 4 and impedance control unit 5, the FT sensor amplifier 11, FT sensor signal processing unit 12 and operational coordinate conversion unit 13 are intervened. However, as long as the value measured by the FT sensor 4 corresponds to the force or torque in the directions of six axes and coincides with the operational force in their coordinates, these FT sensor amplifier 11, signal processing unit 12 and operational coordinate conversion unit 13 may be omitted.

The impedance control unit 5 is connected to the operational force coordinate conversion-unit 13. Generally, the impedance control is to control the operation force Tm of an actuator on the basis of Equation (1) using the actuator as a torque generating means.

$$Tm = (J-Jn)\theta'' + (C-Cn)\theta' + Kn(\theta r - \theta)\theta'' = (1/Jn)\{Kn(\theta r - \theta) - Cn\theta' + Td\} \quad \text{[Equation 1]}$$

In this embodiment, the impedance control unit 5 converts the force or torque in the directions of six axes into the command vector of a velocity or angular velocity in each axial direction so as to make an operating sense of inertial force or viscosity without sensing gravity load and elastic vibration when the operator operates the operation handle 3. Therefore, the operator of the microscope 2 can obtain an analogous operating sense similar to an natural operation and hence is relieved from physical and mental burden.

A known technique can be used as a conversion method in the impedance control unit 5 which can make an operation sense of the inertial force or viscosity. For example, Equation (2) which is a general equation of motion is transformed into Equation (3) to provide a velocity vector from the force/torque vector f detected by the FT sensor 4.

$$Mv'+Cv=f \quad \text{[Equation 2]}$$

where M: an inertia coefficient matrix; C: an viscosity coefficient matrix $$v=(Ms+C)^{-1}f$$

$$v=(Mx\ My\ MZ\ Rx\ Ry\ Rz)^T \quad \text{[Equation 3]}$$

where Mx, My and Mz represent parallel velocity commands in the X, Y and Z axial directions at a focal point and Rx, Ry and Rz represent rotational angular velocities around the X, Y and Z axes at the focal point.

Thus, the component of each axis of the force/torque signal at the operation point 3c (see FIGS. 6 and 7) is converted into the velocity command which is an operation command for each axis. Although the dimension of each of the above inertial coefficient matrix M and viscosity coefficient matrix C may be generally constant, it may be made variable so that the operability can be adjusted.

Further, setting is made in the impedance control unit 5 in such a manner that when the operation handle 3 is operated by both hands, a large operation gain gives a relatively high speed of movement or rotation of the microscope 2 and when the operation handle 3 is operated by a single hand, a small gain gives a relatively low speed of movement or rotation of the microscope 2. Thus, which of speed and accuracy of the movement/rotation of the microscope 2 should be preferred can be selected according to the state of using the microscope 2, i.e. the operation by both hands or the single hand. This is because the speedy operation is required since the operation by both hands intends rough positioning in most cases whereas the accuracy is required since the operation by the single hand intends peeping into the microscope 2 during an operation in most cases.

The track control unit 6 is connected to the impedance control unit 5. The track control unit 6 serves to set the track along which the microscope 2 can move on the basis of the movement mode 2 selected by the operation switches SL1, SL2, SR1 and SR2, and determine the movement or rotation of the microscope 2 corresponding to the operation of the operation handle 3 on the track. Namely, the track control unit 6 converts the movement speed command vector computed in the impedance control unit 5 into the operation command corresponding to each movement mode.

An explanation will be given of the method of converting the movement speed command vector into the operation command for the microscope 2 in each movement mode.

Where the coordinate system of the fixed first arm A1 is used as an original coordinate system and that of the focal position 10 of the microscope 2 is used as a focal point coordinate system, the simultaneous conversion matrix Tf of the focal point coordinate system for the original coordinate system can be acquired by a known technique. For example, the simultaneous conversion matrix Tf for a vector (Δx Δy Δz θx θy θz)T is such as shown in Equation (4). Further, on the basis of the rotation matrix Ru inherent to each mode, a new simultaneous conversion matrix Tf indicated by Equation (5).

$$T_f = \begin{bmatrix} C_zC_y & -S_zC_x+C_zS_yS_x & S_zS_x+C_xS_yC_x & \Delta_x \\ S_zC_y & C_zC_x+S_zS_yS_x & -C_zS_x+S_zS_yC_x & \Delta_y \\ -S_y & C_yS_x & C_yS_x & \Delta_z \\ 0 & 0 & 0 & 1 \end{bmatrix}$$

where S* represents sin(θ*) and C* represents cos(θ*)

$$Tf=Tf\cdot Ru \quad \text{[Equation 5]}$$

For example, the point lock mode, which is an operation of permitting movement of the position and profile of the microscope on only the prescribed sphere around the focal point of the microscope with the focal distance being maintained constant, executes the operation of changing only the profile vector (θu θv θw) without changing the position vector (u v w) of the simultaneous conversion matrix Tf. Actually, only the rotations θu θv w around the u, v and w axes of the focal point coordinate system. For example, the rotation matrix Ru when only θu is rotated around the u axis is expressed by Equation (6).

$$R_w = \begin{bmatrix} 1 & 0 & 0 & 0 \\ 0 & \cos\theta u & -\sin\theta u & 0 \\ 0 & \sin\theta u & \cos\theta u & 0 \\ 0 & 0 & 0 & 1 \end{bmatrix}$$

The operation velocity command vector computed by the impedance control unit 5 is converted by the simultaneous conversion matrix Tf'. In this case, of the components of the operation velocity command vector, only predetermined components which are different according to the movement modes are used.

The all free mode, which is an operation of permitting all the six freedoms of parallel and rotation (change in the profile) in each of the X, Y and Z axes, provides the operation velocity command vector of a focal point as indicated by [Equation 7] (Mx My Mz Rz Ry Rz)$^T$.

The Mx, My and Mz of the operation velocity command vector represent parallel velocity commands in the directions of the X, Y and Z axes of the focal point, and the Rx, Ry and Rz represent the rotation angular velocities around the X, Y and Z axes of the focal point. Therefore, in this mode, the operation velocity vector computed by the impedance control unit 5 is converted as it is.

The point lock mode, which is an operation of permitting the rotation around the focal point which is fixed, provides the operation velocity command vector indicated by Equation (8)

$$(0\ 0\ 0\ Rx+\alpha My\ Ry+\alpha Mx\ Rz)^T \quad \text{[Equation 8]}$$

Therefore, in the operation velocity command vector computed by the impedance control unit 5, the respective components of Mx, My and Mz which represent the parallel velocity commands in the directions of the X, Y and Z axes are disregarded so that even when the force of parallel movement in the axial directions is applied as operation force, the microscope 2 will not move toward the directions. Incidentally, since the operation points 3c of the operation handle 3 during the movement on the sphere around the focal point slightly move in parallel, correction relative to Rx and Ry is made taking the parallel movement into consideration.

The parallel movement mode provides the operation velocity command vector as indicated by Equation (9)

$$(Mx\ My\ Mz\ 0\ 0\ 0)^T \qquad \text{[Equation 9]}$$

Thus, the rotation command around each axis at the operation point 3c is invalid and the orientation of the microscope remains unchanged.

The focus movement mode provides the operation velocity command vector as indicated by Equation (10)

$$(0\ 0\ Mz\ 0\ 0\ Rz)^T \qquad \text{[Equation 10]}$$

Thus, only the parallel movement in the axial direction of the cylinder of the microscope 2 and rotation around this axis are permitted.

It should be noted that the conversion of the operation velocity command vector of the movement and rotation of the microscope 2 in each mode may be executed any other technique as well as the method proposed in this embodiment described above.

Further, as seen from FIG. 2, the motor control unit 7 is intervened between the track control unit 6 and the motor unit for each joint exemplified as the manipulator stand 8. The motor control unit 7 includes a kinetic conversion unit 14, a position command conversion unit 15, position servo control unit 16 and servo driver 17. The motor control unit 7, which controls the motor for driving each of the joints J1 to J6, is illustrated to be connected to the manipulator stand 8 in FIG. 2.

The kinetic conversion unit 14 computes the angular velocity for driving each of the joints JI to J6 when the microscope 2 is operated in accordance with the operation velocity command vector computed by the track control unit 6 described above. The angular velocity of each motor is computed by the inverted kinetic conversion in such a manner that the position and orientation of the microscope 2 are acquired from the angle of each of the joints J1 to J6 obtained the angle sensor and the microscope 2 is operated in accordance with the operation velocity command vector computed by the track control unit 6 described above. Thus, the position (angle) command for each motor is produced.

The position command conversion unit 15 interpolates the angular position command for each motor to create the position (angle) command in synchronism with the position servo system of each motor. Specifically, the position command conversion unit 15 interpolates the angular position of each motor provided by the kinetic conversion unit 14. For this reason, as long as the angular position in each motor has been computed sufficiently finely, the position command conversion unit 15 can be omitted.

Figure 11:
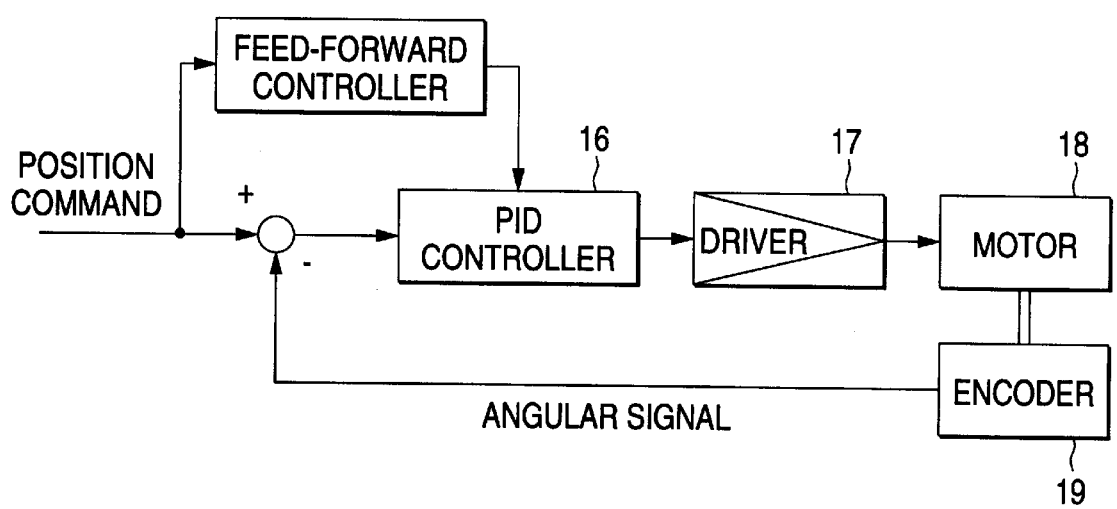
FIG. 11 is a block diagram showing an embodiment of position servo control of a motor.

As seen from FIGS. 2 and 11, a position servo control unit 16 which may be an PID controller, servo driver 17, motor 18 and encoder which serves as an angle sensor for detecting the rotation position by the motor 18 constitute a position (angle) servo control system in which the angle of the motor 18 is detected as an angular signal by the encoder 19 and the detected output is fed back to the position servo control unit 16. The motor for driving each of the joints J1 to J6 attached to the predetermined positions of the manipulator stand 8 is controlled by such a position (angle) servo control system.

In the position (angle) servo control system, the servo driver 17 is a power converter such as a PWM inverter which converts the position command signal outputted from the position servo control unit 16 into power for motor driving to be supplied to the motor 18. The servo driver 17 may also be one including compensation of current feedback. An AC motor which is used as the motor 18 performs commutation control.

In this embodiment, the motor driving is controlled by feed-forward control and feed-back using a common PID controller as the position servo control unit 16, but it may be controlled by any other means.

Referring to the flowchart shown in FIG. 1, an explanation will be given of the operation of the control apparatus for the force assisting device structured as described above.

First, an operator pushes the push switches SL1, SL2, SR1, SR2 attached to the operation handle 3 to operate the operation handle 3 while selecting a desired movement mode. Then, the operation force applied to the operation handle 3 is detected by the FT sensor 4. In response to the operation force applied to the operation handle 3, the FT sensor 4 produces force or torque in directions of six axes as an FT sensor signal (step 101). The FT sensor signal is processed by the FT sensor amplifier 11 and FT sensor signal processing unit 12 so that it is converted into a digital signal relative to the force/torque in the directions of six axes (steps 102 and 103). Further, the relation between the attachment of the FT sensor 4 and the microscope 2 is corrected by the operation force coordinate conversion unit 13 so that the digital signal is converted into the signal relative to the force and torque corresponding to the orientation of the microscope (step 105).

On the other hand, by designation by the operation switches SL1, SL2, SR1 and SR2 such as push switches which have been operated simultaneously with the handle operation, an operation switch signal corresponding to the movement mode of the microscope 2 selected by the operator is produced (step 104). The operation switch signal is transferred to the operation force coordinate conversion unit 13, impedance control unit 5 and track control unit 6. The operation force coordinate conversion unit 13 adopts different coordinate conversion methods according to the operation of the handle 3 by both hands or a single hand.

The signal subjected to the operation force coordinate conversion in step 105 is impedance-controlled by the impedance control unit 5 so that it is converted into a velocity command of giving a sense of inertial force and viscosity to the operator (step 106). In the track control unit 6, the velocity command is selected or converted so that the microscope 2 moves along a prescribed track corresponding to the movement mode set through the switches SL1, SL2, SR1 and SR2 by the operator (step 107).

On the other hand, the rotation angle of each of the motors for driving the joints J1 to J6 respectively has been detected by the encoder coupled with each motor (step 113) The angular signal detected by the encoder is supplied to the kinetic conversion unit 14, position servo control unit 16 and servo motor 17.

In the kinetic conversion unit 14, the velocity command track-controlled for each motor is reverse-kinetic-converted into an angular position command for driving each motor (each axis) (step 108). In the position command conversion unit 15, the angular position command is interpolated to be synchronous with the position servo control unit 16 (step 109). The feed-forward control and feed-back control for the motor driving are executed for each motor (each axis) through the position servo control unit 16 and the servo driver 17 (steps 110 to 112). In this way, by controlling each motor for performing the movement and rotation of the arms A1 to A7, the operator can give the movement or rotation in the desired mode to the microscope 2.

Thus, where the force/torque information given by the operator is impedance-controlled by the impedance control unit 5 to compute the operation command for each of the motors for driving the joints J1 to J6 and each motor is controlled to provide the movement or rotation of the plural arms A1 to A7, the control apparatus for the force assisting device according to this embodiment of the present invention can provide a natural operation sense inclusive of a sense of inertial force and viscosity. Thus, the movement and rotation of the microscope 2 can be effected smoothly so as to be similar to a natural operation.

Although the embodiment described above is a preferred embodiment of the present invention, the present invention may be changed into several modifications without departing the scope of the present invention. For example, in the embodiment described above, the microscope 2 for operation was used as an appliance to be supported, but any other appliance may be used. Concretely, the force assisting device according to this embodiment can be applied to assistance for a helping operation in a hospital or home, for a carrying operation of a heavy object in a general industry and for a direct teaching operation or an industrial robot. In the embodiment, the arms A1 to A7 perform the rotation in both horizontal direction and vertical direction so that the microscope 2 to be supported can be oriented in all the orientations, but they may perform only the vertical or horizontal rotation for various purposes, and in addition thereto, may perform a vertical or horizontal movement.

As apparent from the explanation hitherto made, the method of controlling the force assisting device according to the present invention detects, by the force/torque sensor, operation force applied to an operation handle arranged in the vicinity of an appliance to be supported, impedance-controls and track-controls the detected force/torque information in directions of plural axes to compute the operation command for each joint of a plurality of arms, and moves the arms in the direction of the operation force on the basis of the operation command. Further, the control apparatus for the force assisting device according to the present invention comprises a plurality of arms rotatably coupled with one another; motors each for driving each of the plurality arms; an appliance to be supported attached to the tip of the plurality of arms; an operation handle arranged in the neighborhood of the appliance; a force/torque sensor for detecting operation force; an impedance control unit and track control unit for computing the operation command for each joint on the force/torque information; and motor control unit for performing the motor control on the basis of the operation command for each joint. For this reason, where the force/torque information of the operation force is impedance-controlled to compute the operation command for each joint, thereby providing the movement or rotation of the plural arms, a natural operation sense inclusive of a sense of inertial force and viscosity can be obtained. Thus, the movement and rotation of the microscope 2 can be effected smoothly.

By subjecting the force/torque information of the operation force to the track-control to compute the operation command for each joint, the appliance to be supported can perform the movement or rotation on a prescribed track such as a point lock which is a predetermined operation mode and hence its operability can be improved.

What is claimed is:

1. A method of controlling a force assisting device in which said force assisting device includes an appliance supported by a plurality of arms coupled so as to be sequentially drivable through joints on a stand; an operation handle arranged in the neighborhood of the appliance and operated by an operator in order to move said appliance; a force/torque sensor for producing an operation force applied to said operation handle as force/torque information in directions of plural-axes; and a motor control unit for controlling motors arranged to drive the plurality of arms through said joints, respectively, said method comprising:

detecting, with said force/torque sensor, said operation force applied to said operation handle;

computing an operation command for each of said motors by adding impedance-control and track-control on the basis of the detected force/torque information; and moving said appliance in the direction of the operation force applied to said operation handle through said plurality of arms by said motor control unit on the basis of said operation command thus computed.

2. A method of controlling a force assisting device according to claim 1, wherein said operation handle is provided with an operation switch for setting a movement mode designating the movement direction of said appliance and, wherein an operation command for each of said joints is computed using only the information required for the movement mode set by said operation switch in the force/torque information in directions of plural-axes.

3. A method of controlling a force-assisting device in which said force assisting device can include an appliance supported on the tip of a plurality of arms sequentially drivable through joints on a stand; an operation handle located within the physical proximity of the appliance and capable of being operated by an operator in order to move said appliance; a force/torque sensor operable to produce an operation force applied to said operation handle as force/torque information in directions of plural-axes; and a motor control unit operable to control motors arranged to drive the plurality of arms through said joints, respectively, said method comprising:

detecting said operation force applied to said operation handle by said force/torque sensor;

computing an operation command for each of said motors by adding impedance-control and track-control on the basis of the detected force/torque information; and moving said appliance in the direction of the operation force applied to said operation handle through said plurality of arms by said motor control unit on the basis of said operation command thus computed, wherein said operation handle is provided with an operation switch operable to set a movement mode designating the movement direction of said appliance and an operation command for each said joint is computed using only the information required for the movement mode set by said operation switch in the force/torqued information in directions of plural-axes, and wherein further said operation handle is provided with two holding portions which an operator can operate by both hands, each of said two holding portions being provided with the operation switch for setting the same movement mode, and is controlled so that the movement velocity of said appliance when the handle is operated by both hands is higher than that when operated by a single hand.

4. A method of controlling a force-assisting device in which said force-assisting device can include an appliance supported on the tip of a plurality of arms sequentially drivable through joints on a stand; an operation handle located within the physical proximity of the appliance and capable of being operated by an operator in order to move said appliance; a force/torque sensor operable to produce an operation force applied to said operation handle as force/torque information in directions of plural-axes; and a motor control unit operable to control motors arranged to drive the plurality of arms through said joints, respectively, said method comprising:
   detecting said operation force applied to said operation handle by said force/torque sensor;
   computing an operation command for each of said motors by adding impedance-control and track-control on the basis of the detected force/torque information; and
   moving said appliance in the direction of the operation force applied to said operation handle through said plurality of arms by said motor control unit on the basis of said operation command thus computed,
wherein said operation handle is provided with an operation switch operable to set a movement mode designating the movement direction of said appliance and an operation command for each said joint is computed using only the information required for the movement mode set by said operation switch in the force/torqued information in directions of plural-axes, and
   wherein further the operation command for each of said joints acquires the velocity command for each of said joints in said plurality of arms on the basis of an equation of motion of inertial force and viscosity and gives an operation sense of inertial force and viscosity to the movement of said appliance.

5. A control apparatus for controlling a force assisting device comprising:
   a plurality of arms coupled so as to be sequentially drivable through joints on a stand;
   a plurality of motors for driving said plurality of arms through said joints, respectively;
   an appliance supported by and attached to said plurality of arms;
   an operation handle located in the vicinity of the appliance and operated by an operator in order to move said appliance;
   a force/torque sensor operable to determine an operation force applied to said operation handle as force/torque information in directions of plural-axes;
   an impedance control unit and track control unit operable to compute an operation command for each of said joints in said plurality of arms on the basis of said force/torque information detected by said force/torque sensor; and
   a motor control unit operable to control said motors so as to drive said plurality of arms through each of said joints on the basis of the operation command of each of said joints.

6. A control apparatus for a force assisting device according to claim 5, wherein said operation handle is provided with an operation switch for setting a movement mode designating the movement direction of said appliance and, wherein an operation command for each of said joints is computed using only the information required for the movement mode set by said operation switch in the force/torqued information in the directions of plural-axes.

7. A control apparatus for a force assisting device according to claim 5, wherein said arms for executing the vertical rotation include a mechanism of a pair of parallel links, and a swinging center of each of said parallel links is aligned in a plumb direction.

8. A control apparatus for a force assisting device according to claim 7, wherein said force/torque sensor acquires said signal in the directions of the six-axes by processing an output signal from each of a plurality of distortion gauges attached to its body.

9. A control apparatus for controlling a force assisting device comprising:
   a plurality of arms coupled so as to be sequentially drivable through joints on a stand;
   a plurality of motors for driving said plurality of motors through said joints, respectively;
   an appliance to be supported attached to said tip of said plurality of arms coupled with each other;
   an operation handle arranged in the vicinity of the appliance and operated by an operator in order to move said appliance;
   a force/torque sensor for producing operation force applied to said operation handle as force/torque information in directions of plural-axes;
   an impedance control unit and track control unit for computing an operation command for each said joint in said plurality of arms on the basis of said force/torque information detected by said force/torque sensor; and
   a motor control unit for controlling said motors so as to drive said plurality of arms through each said joint on the basis of the operation command of each said joint,
wherein said impedance control unit acquires the velocity command for each of said joints in said plurality of arms on the basis of an equation of motion of inertial force and viscosity, and wherein said command provides an operation sense of inertial force and viscosity to the movement of said appliance.

10. A control apparatus for a force assisting device according to claim 9, wherein said plurality of arms serve to perform one of a vertical movement, horizontal movement, horizontal rotation and vertical rotation, and said force/torque sensor produces a signal relative to the directions of six axes of an X-axis, Y-axis and Z-axis and directions around these axes.

11. A control apparatus for a force assisting device according to claim 9, wherein said track control unit sets a track along which said appliance is to move in the movement mode set by said operation switch and converts the velocity command computed by said impedance control unit to agree to a designated movement mode.

12. A control apparatus for a force assisting device according to claim 11 further comprising:
   a motor control unit including a kinetic conversion unit for producing a position command of each of said motors when said appliance is moved in accordance with the velocity command computed by said track control unit;
   a position servo control unit operable to control the position of each of said motors in accordance with the position command of each of said motors; and
   a servo driver for driving each of said motors,
   wherein said motor control unit, said position servo control unit and said servo driver are arranged between said track control unit and said motors for driving said arms.

13. A control apparatus for a force assisting device according to claim 12 further comprising:
   a force/torque sensor amplifier for extracting the force/torque information from said force/torque sensor as an analog signal, amplifying the analog signal and converting it into a digital signal;
   a force/torque sensor signal processing unit for filtering the digital signal from said force/torque sensor amplifier to noise-cut a high frequency component thereof; and an operational force coordinate conversion unit for correcting a deviation of the operational direction of said operation handle from the direction of attaching said force/torque sensor, wherein said force/torque sensor amplifier, said force/torque sensor signal processing unit, said operational force coordinate conversion unit are arranged between said force/torque sensor and said impedance control unit.

14. A control apparatus for controlling a force assisting device comprising:

a plurality of arms coupled so as to be sequentially drivable through joints on a stand;

a plurality of motors for driving said plurality of motors through said joints, respectively;

an appliance to be supported attached to said tip of said plurality of arms coupled with each other;

an operation handle arranged in the vicinity of the appliance and operated by an operator in order to move said appliance;

a force/torque sensor for producing operation force applied to said operation handle as force/torque information in directions of plural-axes;

an impedance control unit and track control unit for computing an operation command for each said joint in said plurality of arms on the basis of said force/torque information detected by said force/torque sensor, wherein said impedance control unit acquires the velocity command for each said joint in said plurality of arms on the basis of an equation of motion of inertial force and viscosity and said track control unit sets the track along which said appliance is to move on the movement mode set by said operation switch and converts the velocity command computed by said impedance control unit to agree to a designated movement mode;

a motor control unit for controlling said motors so as to drive said plurality of arms through each said joint on the basis of the operation command of each said joint, wherein said motor control unit includes a kinetic conversion unit for producing a position command of each said motor when said appliance is moved in accordance with the velocity command computed by said track control unit;

a position servo control unit for controlling the position of each said motor in accordance with the position command of each said motor;

a servo driver for driving each said motor, wherein said motor control unit, said position servo control unit and said servo driver are arranged between said track control unit and said motors for driving said arms;

a force/torque sensor amplifier for extracting the force/torque information from said force/torque sensor as an analog signal, amplifying the analog signal and converting it into a digital signal;

a force/torque sensor signal processing unit for filtering the digital signal from said force/torque sensor amplifier to noise-cut its high frequency component; and an operational force coordinate conversion unit for correcting a deviation of the operational direction of said operation handle from the direction of attaching said force/torque sensor, wherein said force/torque sensor amplifier, said force/torque sensor signal processing unit, said operational force coordinate conversion unit are arranged between said force/torque sensor and said impedance control unit.

* * * * *